(No Model.)

J. COSGROVE.
THILL COUPLING.

No. 413,335. Patented Oct. 22, 1889.

Witnesses
E. S. Newman
Louis G. Julihn

Inventor
JOHN COSGROVE.
By his Attorneys
Hopkins & Atkins

UNITED STATES PATENT OFFICE.

JOHN COSGROVE, OF OXFORD, INDIANA.

THILL-COUPLING.

SPECIFICATION forming part of Letters Patent No. 413,335, dated October 22, 1889.

Application filed June 7, 1889. Serial No. 313,496. (No model.)

*To all whom it may concern:*

Be it known that I, JOHN COSGROVE, of Oxford, in the county of Benton and State of Indiana, have invented certain new and useful Improvements in Thill-Couplings of Vehicles, of which the following is a specification, reference being had to the accompanying drawings.

The object of my invention is to provide a yielding spring-connection between the thills or pole, as the case may be, and the front axle of a vehicle. Where there is a rigid connection between the thills and the front axle sudden shocks, occasioned by the wheel striking an obstacle or by cramping and one wheel striking the vehicle-body, often result in breaking the coupling or the thills, pole, or some part of the harness.

My improvements prevent such accidents, and consist in the organization of mechanism hereinafter described and claimed.

Figure 1:
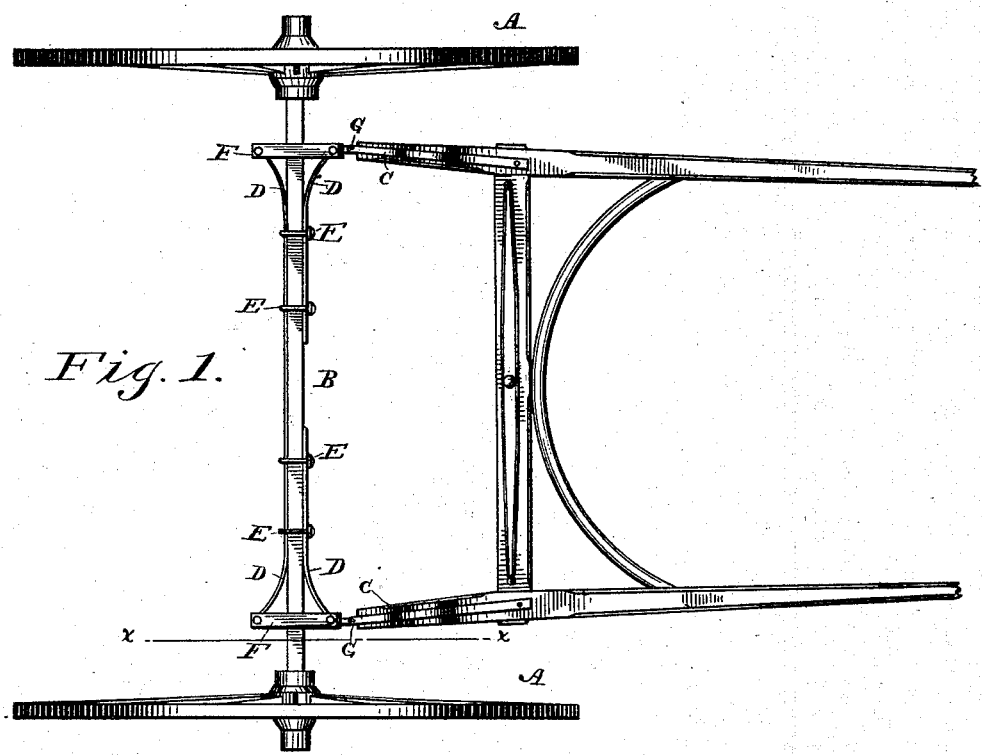
Figure 2:
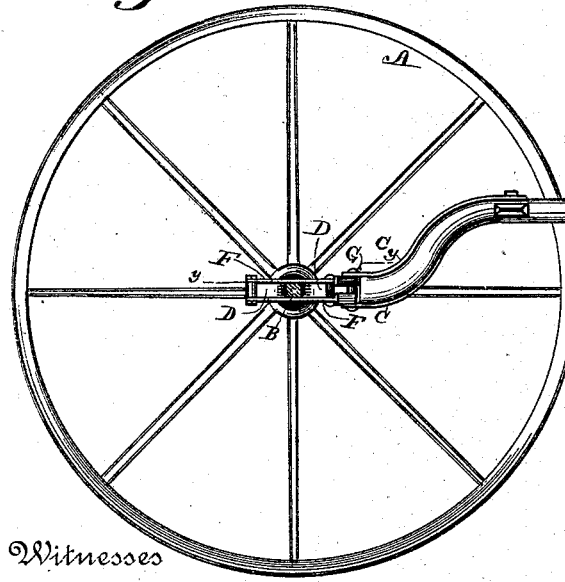
Figure 3:
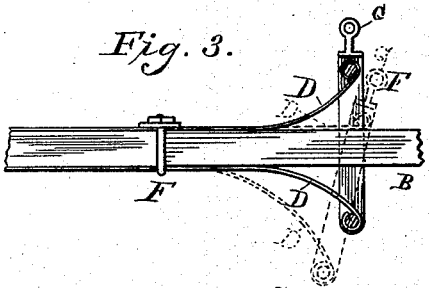

In the accompanying drawings, Figure 1 is a plan view of the fore part of a wagon with my improved thill-coupling attached. Fig. 2 is a section on the line $x\,x$ of Fig. 1. Fig. 3 is a detailed view of part of an axle with my thill-coupling attached.

Referring to the letters upon the drawings, A indicates a pair of wheels, and B an axle, which may be assumed to be the front wheels of any road-vehicle.

C indicates a pair of thills; but a pole might of course be used.

D indicates springs, which are attached by means of clips E, or otherwise, firmly to the axle.

F indicates two frame-pieces, which may be cast in one piece or formed of separate pieces adapted to fit on the axle, and they are secured at each end firmly to the ends of the springs in any suitable manner. The frame-pieces, by the action of the springs, will slide backward and forward on the axle, and thus prevent strain upon the thill-couplings, thills, or harness on an animal. Normally, however, the frame-pieces will rest near their centers, straddling the axle horizontally, so that any sudden strain from the front or rear will be taken up by the springs and a severe shock thus obviated. The frame-pieces are hinged to the thills or pole by vertical hinges at G, as illustrated, so that the sliding motion of the frame-pieces fastened to the ends of the springs is accommodated without straining the fastenings.

This improved hinge-and-spring connection between the axle and the thills or poles of a vehicle is adapted to all classes of road-vehicles, and obviates ordinary liability to such accidents as cause breaks occasioned by shocks, which often frighten animals and result in injury or death to persons riding.

What I claim is—

The combination, with a vehicle-axle, of front and back springs D secured thereto, frame-pieces E, to which the ends of the springs are fastened, and thills or a pole pivoted to the frame-pieces, substantially as set forth.

In testimony of all which I have hereunto subscribed my name.

JOHN COSGROVE.

Witnesses:
 JOHN F. MCHUGH,
 HARRY HERRMAN.